(12) United States Patent
Mueller (10) Patent No.: US 9,676,278 B2
(45) Date of Patent: Jun. 13, 2017

(54) VEHICLE ELECTRICAL NETWORK HAVING AT LEAST TWO ENERGY STORAGE DEVICES, METHOD FOR OPERATING A VEHICLE ELECTRICAL NETWORK, AND MEANS FOR THE IMPLEMENTATION THEREOF

(71) Applicant: Robert Bosch GmbH, Stuttgart (DE)

(72) Inventor: Wolfgang Mueller, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 589 days.

(21) Appl. No.: 14/207,056

(22) Filed: Mar. 12, 2014

(65) Prior Publication Data

US 2014/0285003 A1    Sep. 25, 2014

(30) Foreign Application Priority Data

Mar. 20, 2013  (DE) .................. 10 2013 204 894

(51) Int. Cl.
*B60L 7/10* (2006.01)
*B60L 7/20* (2006.01)
(Continued)

(52) U.S. Cl.
CPC .............. *B60L 7/10* (2013.01); *B60L 1/003* (2013.01); *B60L 1/02* (2013.01); *B60L 1/14* (2013.01); *B60L 3/0023* (2013.01); *B60L 3/0046* (2013.01); *B60L 3/0061* (2013.01); *B60L 3/0092* (2013.01); *B60L 7/12* (2013.01); *B60L 7/20* (2013.01); *B60L 11/14* (2013.01); *B60L 11/1855* (2013.01); *B60L 11/1861* (2013.01); *B60L 11/1864* (2013.01); *B60L 15/20* (2013.01); *B60L 15/2009* (2013.01); *B60L 2210/30* (2013.01); *B60L 2210/40* (2013.01); *B60L 2240/36* (2013.01); *B60L 2240/421* (2013.01); *B60L 2240/429* (2013.01); *B60L 2240/441* (2013.01); *B60L 2240/445* (2013.01); *B60L 2240/527* (2013.01); *B60L 2240/547* (2013.01); *B60L 2240/662* (2013.01); *B60L 2250/16* (2013.01); *B60L 2260/22* (2013.01); *B60L 2260/24* (2013.01);
(Continued)

(58) Field of Classification Search
CPC ........................................... B60L 7/10
USPC ........................................... 307/10.1
See application file for complete search history.

(56) References Cited

U.S. PATENT DOCUMENTS

| 2001/0052760 | A1 | 12/2001 | Amano et al. | |
|---|---|---|---|---|
| 2007/0095586 | A1* | 5/2007 | Luedtke | B60K 1/00 180/65.31 |
| 2012/0032505 | A1* | 2/2012 | Kusumi | B60L 11/123 307/10.1 |

FOREIGN PATENT DOCUMENTS

DE      197 33 221      2/1999

* cited by examiner

*Primary Examiner* — Joseph Chang
(74) *Attorney, Agent, or Firm* — Norton Rose Fulbright US LLP; Gerard Messina (57) ABSTRACT

A vehicle electrical network has: an electric machine configured to operate at least in generator mode; a first energy storage device; a second energy storage device; and a switching arrangement by which the switching states a) through c) described below can be set alternatively to one another: a) either only the first energy storage device or only the second energy storage device is connected to the electric machine; b) the first energy storage device and the second energy storage device are connected in parallel to the electric (Continued)

machine; and c) the first energy storage device and the second energy storage device are connected in series to the electric machine.

14 Claims, 6 Drawing Sheets

(51) Int. Cl.
*B60L 1/00* (2006.01)
*B60L 1/14* (2006.01)
*B60L 3/00* (2006.01)
*B60L 11/18* (2006.01)
*B60L 1/02* (2006.01)
*B60L 11/14* (2006.01)
*B60L 15/20* (2006.01)
*B60L 7/12* (2006.01)

(52) U.S. Cl.
CPC .......... *B60L 2260/26* (2013.01); *Y02T 10/645* (2013.01); *Y02T 10/70* (2013.01); *Y02T 10/7005* (2013.01); *Y02T 10/7044* (2013.01); *Y02T 10/7061* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01)

VEHICLE ELECTRICAL NETWORK HAVING AT LEAST TWO ENERGY STORAGE DEVICES, METHOD FOR OPERATING A VEHICLE ELECTRICAL NETWORK, AND MEANS FOR THE IMPLEMENTATION THEREOF

BACKGROUND OF THE INVENTION

1. Field of the Invention

The present invention relates to a vehicle electrical network having at least two energy storage devices, a method for operating such a vehicle electrical network, and means for implementing the method.

2. Description of the Related Art

The recovery of braking energy in motor vehicles through so-called recuperation is known. In a recuperation system used for this, during a braking process braking energy is converted into electrical energy by an electric machine, for example a claw pole generator, and is stored in a battery or in some other energy storage device. This energy is used to supply electric consumers, thus making it possible to save fuel.

If the mechanical braking power demanded by the driver is less than or equal to the performance capacity of the recuperation system, the braking typically takes place exclusively via the recuperation system. If the braking power requested by the driver is greater than this, then in addition a conventional (e.g. hydraulic) braking system is used for braking. In this case, it is not possible to convert all of the mechanical braking energy into electrical energy.

The possible saving of fuel through recuperation is therefore a function not only of the driving cycle and the driver's actions, but also of the performance capacity of the recuperation system. The performance capacity of the recuperation system is limited by the maximum generator power of the electric machine and by the maximum electric storage capacity of the energy storage device or devices in the vehicle electrical network.

In addition, so-called coasting operation is known as a fuel-saving measure. Here, during a so-called coasting phase the internal combustion engine is decoupled from the rest of the drive train. Through the decoupling of the internal combustion engine, the engine drag torque no longer acts on the rest of the drive train during the coasting phase. Therefore, the coasting phase of the vehicle is essentially lengthened, in comparison with so-called propulsion operation, when the internal combustion engine is coupled. If the internal combustion engine is switched off during the coasting phase, this results in a savings of fuel, as a function of the driving cycle and the driver's behavior. In vehicles having a conventional drivetrain, the electric consumers are supplied with power exclusively from the energy storage device or devices during the coasting phase, because the generator is no longer driven by the internal combustion engine.

Coasting and recuperation are not mutually exclusive, but rather can supplement one another. For example, coasting operation can be introduced when the driver is actuating neither the gas pedal nor the brake. The recuperation of braking energy can take place when the driver actuates the brakes.

The performance capacity for recuperation of 14V claw pole generators, standardly used in vehicles (passenger vehicles), having passive B6 bridge rectification is limited due to the low output voltage. It is true that the output voltage of claw pole generators can be increased as described in published German patent application document DE 197 33 221 A1, where a voltage adaptation to the 14V vehicle electrical network is carried out using a DC/DC converter. However, the use of a DC/DC converter increases costs. Known vehicle electrical networks also have further problems, and are frequently not effectively usable, or not sufficiently so, for carrying out both recuperation and coasting operation, as is explained below.

Therefore, there is a need for vehicle electrical networks that can be used flexibly for recuperation and coasting operation, which in particular also can provide adequate recuperation power and are fail-safe.

BRIEF SUMMARY OF THE INVENTION

The present invention achieves the object of enabling a high-performance recuperation, compared to known 14V vehicle electrical networks, by providing a vehicle electrical network having at least two energy storage devices. These are optionally capable of being connected individually, in series, or in parallel to an electric machine that is provided in the vehicle electrical network and that can be operated at least in generator mode. In this way, at the same time a redundant supply of electrical energy is provided for coasting operation. The present invention additionally enables the prevention of a disturbing voltage collapse in the vehicle electrical network during the starting of the internal combustion engine. At the same time, the degree of efficiency of the generator used is increased.

In the following, the electric machine that can be operated as a generator is also briefly referred to as a generator. A generator can be operated exclusively in generator mode, but the present invention can also be used for example with so-called starter generators that can also be operated as motors, and can therefore generate a corresponding torque, for example for an engine start or in order to support the internal combustion engine (e.g. in order to compensate turbo lag, or in general in so-called boost operation). The generator, or the electric machine that can be operated in generator mode, and the at least two energy storage devices, for example conventional motor vehicle batteries, are each wired to one another via a number of electromechanical or semiconductor-based circuit elements (e.g. relays or transistors) and diodes.

As already explained, conventional vehicle electrical networks have faults with regard to recuperation. Because only limited constructive space is available for the 14V generator here typically used on the belt drive, the electric power of the generator (typically a claw pole generator) is limited. This causes reduced recuperation performance in comparison with hybrid or electric vehicles. Moreover, costs increase with the use of a 14V generator having higher power. At higher electrical power levels at 14V, large electrical currents result. These require lines having a large cross-section, resulting in additional costs and weight.

The maximum possible electrical power consumption of known vehicle batteries having battery capacity typical for passenger vehicles also limits the maximum possible recuperation in corresponding vehicle electrical networks.

As stated above, conventional vehicles however also have flaws with regard to coasting operation. In the case of an internal combustion engine as sole drive, the generator is typically coupled to the internal combustion engine via the belt drive. If during the coasting phase the internal combustion engine is switched off and is decoupled from the rest of the drive train, the generator cannot supply any electrical energy. The vehicle electrical network is then supplied with energy only by the vehicle battery. If this fails due to a fault, all electrical consumers are then no longer supplied with power. This causes a failure of almost all vehicle functions, e.g. power steering, lights, dashboard displays, windshield wipers, etc.

In contrast, the advantages of the present invention include an increase in fuel savings through recuperation, enabled by an increase in the generator voltage. In this way there results an increase in the generator power available as braking power. The solution of the present invention includes a variable interconnection of the at least two energy storage devices, e.g. at least two vehicle batteries, resulting in an increase in the maximum charge power or capacity of the electric storage system. This enables currents or voltages produced at higher generator power levels to be fed into the vehicle electrical network, and thus enables an overall increase in fuel savings during recuperation.

As a function of the respective operating point of the generator, for example rotational speed and output power, an improvement can be achieved in the generator efficiency by switching over to a different generator output voltage. The generator output voltage can thus be set as a function of the operating point. The at least two energy storage devices are in addition redundantly available for coasting operation, increasing security against failure. Safety-relevant consumers will no longer fail when there is a failure of an energy storage device.

Through the variable connection of the at least two energy storage devices, when the internal combustion engine is started at least one of the energy storage devices can be connected to a starter, and at least one other energy storage device can be connected, independently thereof, to the electric consumers. In this way, a starter circuit and a consumer circuit are created. When the internal combustion engine is started, due to the decoupled starter circuit there occurs no disturbing voltage collapse in the consumer circuit. This is advantageous in particular in known start-stop systems in warm starting mode (e.g. after stopping at a traffic light).

In the case of a cold start, in which voltage drops are typically less disturbing, in contrast the available electrical power can be increased through the connection in parallel of at least two energy storage devices.

The present invention also enables a containment of generator errors; i.e., the spread of errors from the generator to the supply network is prevented. This additionally increases security against failure.

The present invention provides a lower-cost solution than, for example, the disclosure of the above-mentioned published German patent application document DE 197 33 221 A1, because it does without a DC/DC converter.

As mentioned, the advantages of the present invention are achieved by a variable connection of at least two energy storage devices (e.g. two batteries) in the vehicle electrical network. The variability in the connection is achieved through the use of corresponding switching elements and/or diodes. The batteries are coupled to one another as a function of the driving state and of the state of the vehicle electrical network in such a way that the advantages of the present invention result.

In a corresponding vehicle electrical network having at least one electric machine that can be operated as a generator, a first energy storage device, and a second energy storage device, according to the present invention means are provided by which all of the switching states indicated below can be optionally set, alternatively to one another:

a) either only the first energy storage device or only the second energy storage device is connected to the electric machine;
b) the first energy storage device and the second energy storage device are connected in parallel to the electric machine;
c) the first energy storage device and the second energy storage device are connected in series to the electric machine.

A method according to the present invention here includes the setting of these switching states alternatively to one another. In particular, the electric machine is operated as a generator and the output voltage of the electric machine in switching state c) is set higher than in switching state a) and/or b).

As a means for implementing the method according to the present invention, in particular as a program, a computing unit according to the present invention, e.g. a control device for a vehicle electrical network, is configured to carry out a method according to the present invention.

The implementation of the method in the form of software is also advantageous because this results in particularly low costs, in particular if an executing control device is also used for further tasks and is therefore already present anyway. Such a control device is equipped with a suitable data carrier for storing a corresponding computer program, for example a hard drive and/or a flash memory.

Further advantages and embodiments of the present invention result from the description and from the accompanying drawing.

Of course, the features named above and the features explained below may be used not only in the respectively indicated combination, but also in other combinations or by themselves, without departing from the scope of the present invention.

DETAILED DESCRIPTION OF THE INVENTION

Figure 1:
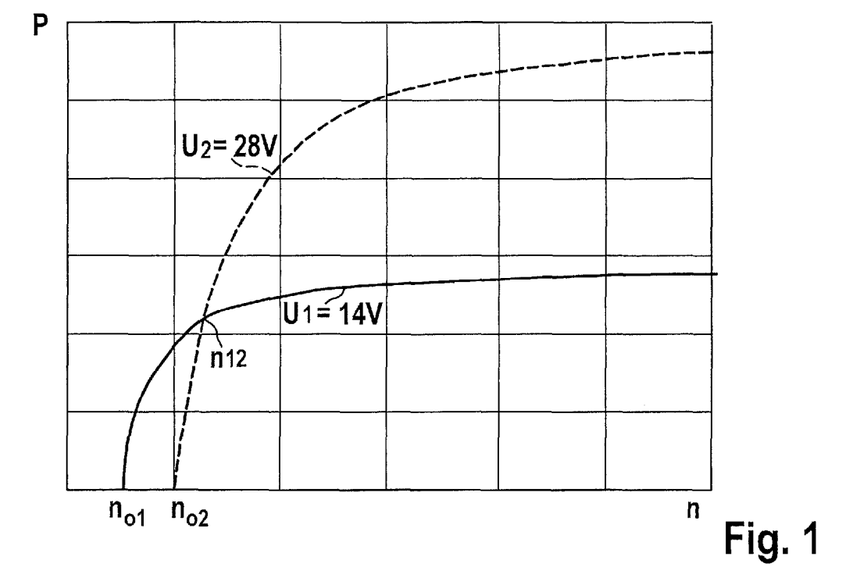
FIG. 1 illustrates a maximum output power curve of a 14V claw pole generator having a passive B6 bridge rectifier over a generator rotational speed, for output voltages of 14V and 28V.

FIG. 1 shows as an example the typical curve of the maximum output power P of a 14V claw pole generator having a passive B6 bridge rectifier on the ordinate, over generator rotational speed n on the abscissa, for output voltages $U_2=14V$ and $U_2=28V$.

If the generator is feeding a 14V vehicle electrical network, it can supply electric power starting from a generator rotational speed $n_{o1}$. In contrast, when feeding into a 28V vehicle electrical network the same generator can supply electric power only starting from a rotational speed of $n_{o2}$.

Given a generator output voltage of $U_2=28V$, starting from a generator rotational speed $n>n_{12}$ there results a significantly higher maximum output power than when supplying a 14V vehicle electrical network. The present invention makes use of this effect to increase the output power of the generator during recuperation.

Figure 2:
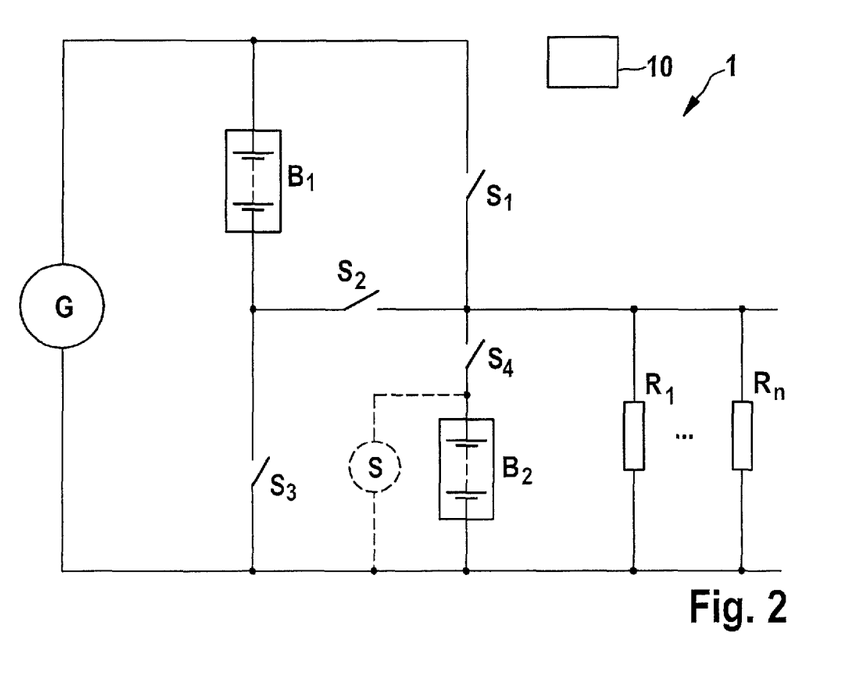
FIG. 2 shows a vehicle electrical network according to a specific embodiment of the present invention, in a simplified schematic representation.

FIG. 2 shows a simplified schematic representation of a vehicle electrical network according to a specific embodiment of the present invention, in the form of a circuit diagram. The vehicle electrical network is designated 1 overall.

Vehicle electrical network 1 has a first energy storage device $B_2$ and a second energy storage device $B_2$ that can be fashioned for example in the form of similar or different vehicle batteries, e.g. in the form of two 12V vehicle batteries. Energy storage devices $B_2$ and $B_2$ can be variably interconnected by switching elements $S_1$, $S_2$, $S_3$, and $S_4$. Electric consumers are illustrated in the form of resistances $R_1$ through $R_n$. A generator G feeds electric power into vehicle electrical network 1. An electric start device 5, for example a starter, is connected to second energy storage device $B_2$. In this Figure, and in FIGS. 8 through 11, a control device is designated 10, and is fashioned for the controlling of switching elements $S_1$, $S_2$, $S_3$, and $S_4$, when they are present.

In the following, $S_n=0$ designates an open switching element, and $S_n=1$ designates a closed switching element. The switching states of vehicle electrical network 1 shown in FIGS. 3 through 7 and explained further below are set using switching elements $S_1$ through $S_4$.

Figure 3:
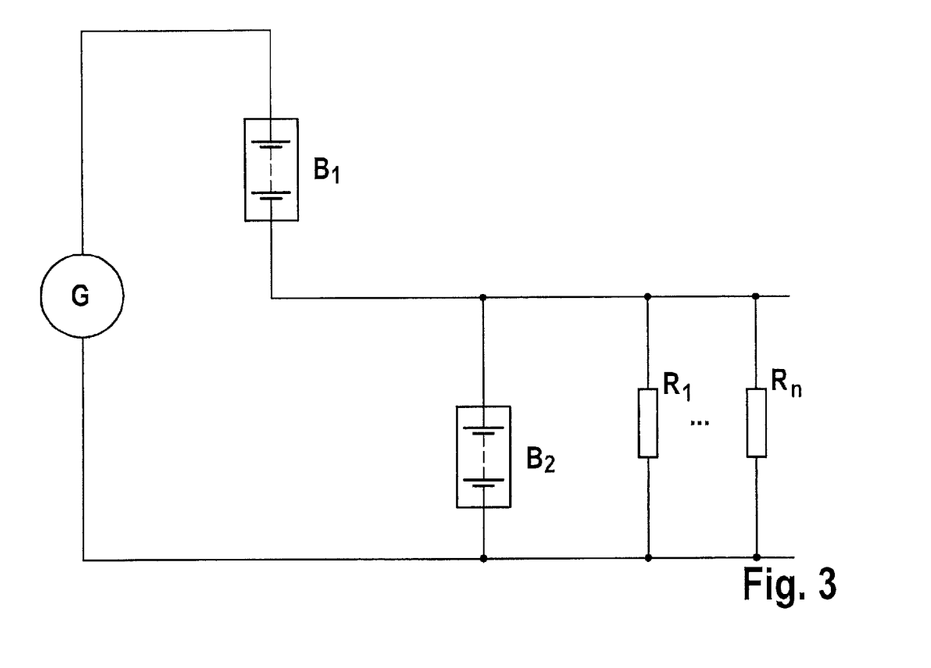
FIG. 3 shows the vehicle electrical network of FIG. 2, in a switching state provided according to a specific embodiment of the present invention.

When $S_1=0$, $S_2=1$, $S_3=0$, and $S_4=1$, a switching state results as shown in FIG. 3.

According to FIG. 3, the two energy storage devices $B_1$ and $B_2$ are connected in series. Generator G here supplies electric power to vehicle electrical network 1 with an output voltage of approximately 28V, correspondingly adjusted. Second energy storage device $B_2$ and generator G supply consumers $R_1$ through $R_n$ with a voltage of 14V.

The switching state as shown in FIG. 3 can be selected when both energy storage devices $B_1$ and B2 are to be charged simultaneously. The switching state shown in FIG. 3 is however preferably selected during recuperation. The higher output voltage of generator G also yields a higher output power for generator rotational speeds $n>n_{12}$ (cf. FIG. 1). Through the connection in series of the two energy storage devices $B_1$ and $B_2$, the maximum possible power capacity is doubled in comparison to a single energy storage device $B_1$ or $B_2$ (e.g. a single vehicle battery).

During recuperation, first energy storage device $B_1$ is charged more strongly than is second energy storage device $B_2$, because consumers $R_1$ through $R_n$ are connected parallel to second energy storage device $B_2$. If first energy storage device $B_1$ is driven to the upper limit of its charge state, then first energy storage device $B_1$ has to be discharged in order to enable further recuperation processes. The discharging of first energy storage device $B_1$ preferably takes place by setting the switching state shown in FIG. 4.

Figure 4:
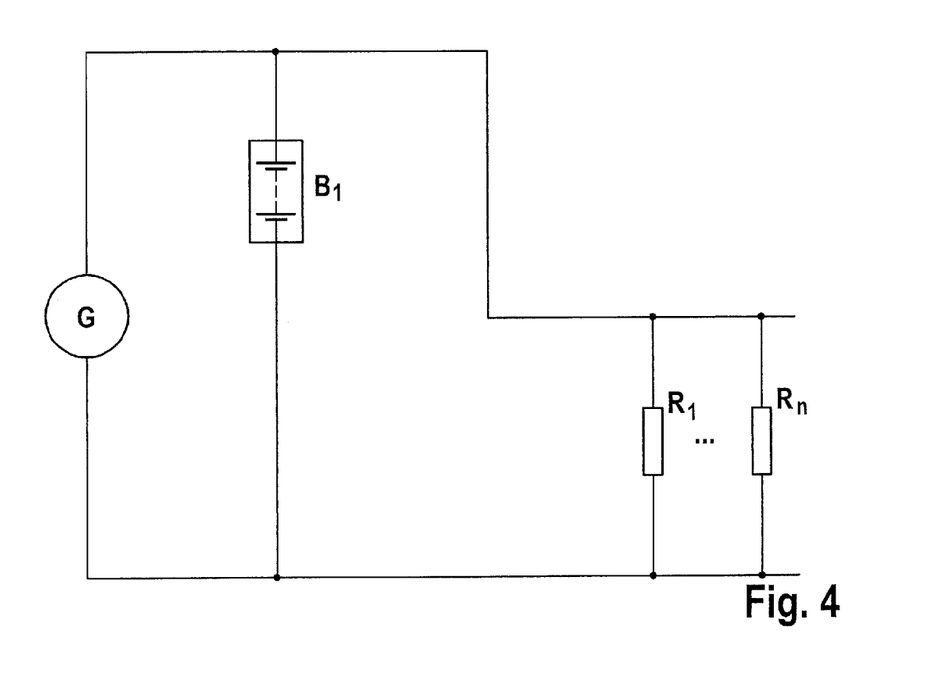
FIG. 4 shows the vehicle electrical network of FIG. 2 in a further switching state provided according to a specific embodiment of the present invention.

When $S_1=1$, $S_2=0$, $S_3=1$, and $S_4=0$, a switching state results as shown in FIG. 4.

According to FIG. 4, generator G is connected only to first energy storage device B. At an output voltage of approximately 14V, generator G supplies electric power to vehicle electrical network 1. If the generator power is less than the power consumed by consumers $R_1$ through $R_n$, then first energy storage device $B_1$ is discharged. If the generator power is greater than the power consumed by consumers $R_1$ through $R_n$, then first energy storage device $B_1$ is charged.

The switching state according to FIG. 4 is advantageously used when first energy storage device $B_1$ has reached its upper permissible charge state, for example due to recuperation processes with the switching state shown in FIG. 3. In this case, the generator power is reduced far enough that first energy storage device $B_1$ is discharged through consumer current $R_1$ through $R_n$. In the switching state shown in FIG. 4, first energy storage device $B_1$ can again be discharged far enough that further recuperation processes are possible with the switching state shown in FIG. 3.

In the switching state according to FIG. 4, first energy storage device $B_1$ can be charged without influencing the charge state of second energy storage device $B_2$. If the generator current is greater than the current consumed by consumers $R_1$ through $R_n$, first energy storage device $B_1$ is charged.

The switching state shown in FIG. 4 can also be used for recuperation at low generator rotational speed $n<n_{12}$ (cf. FIG. 1). In this case, electrical recuperation power can be stored in first energy storage device $B_1$ even at a low generator rotational speed.

Figure 5:
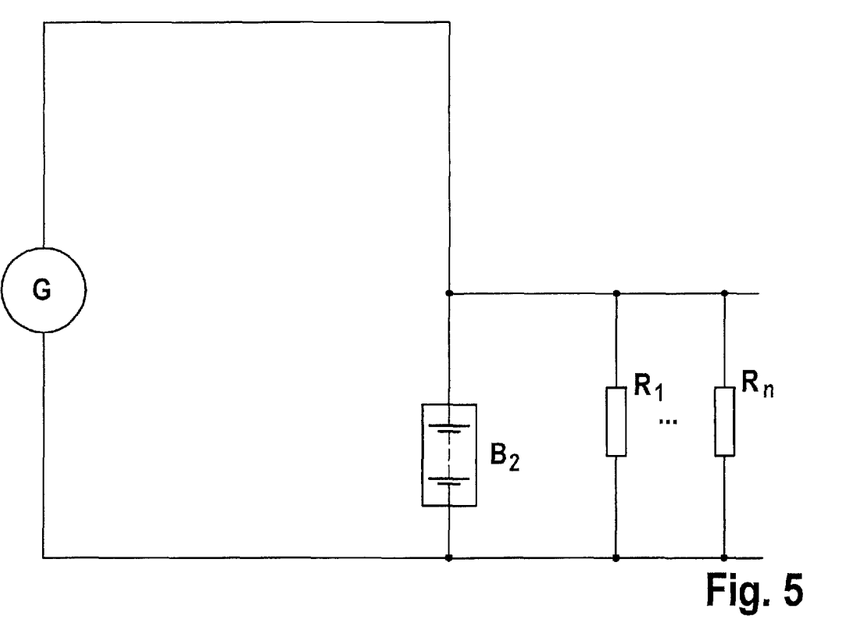
FIG. 5 shows the vehicle electrical network of FIG. 2 in a further switching state provided according to a specific embodiment of the present invention.

When $S_1=1$, $S_2=0$, $S_3=0$, and $S_4=1$, a switching state results as shown in FIG. 5.

According to FIG. 5, generator G is connected only to second energy storage device $B_2$. At an output voltage of approximately 14V, generator G supplies electric power to the vehicle electrical network. If the generator current is smaller than the current consumed by consumers $R_1$ through $R_n$, second energy storage device $B_2$ is discharged. If the generator current is greater than the current consumed by consumers $R_1$ through $R_n$, then second energy storage device $B_2$ is charged. This switching state can also be used for recuperation with a low generator rotational speed $n<n_{12}$ (cf. FIG. 1). In this case, electric recuperation power can be stored in second energy storage device $B_2$ even at a low generator rotational speed.

Figure 6:
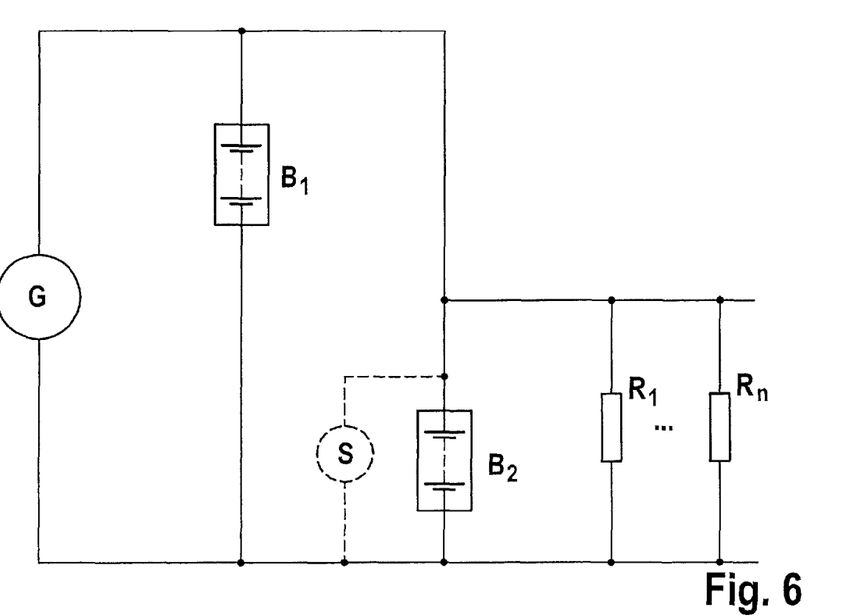
FIG. 6 shows the vehicle electrical network of FIG. 2 in a further switching state provided according to a specific embodiment of the present invention.

When $S_1=1$, $S_2=0$, $S_3=1$, and $S_4=1$, a switching state results as shown in FIG. 6.

In FIG. 6, the two energy storage devices $B_1$ and $B_2$ are connected in parallel. This switching state can advantageously be used when both energy storage devices $B_1$ and $B_2$ are to be charged or discharged simultaneously. A further possible case of application occurs when a high electrical starting power is required for the starting of an internal combustion engine with the aid of a starting device S, e.g. a starter. This can for example be the case when, at low temperatures, an internal combustion engine, for example a diesel engine having a large engine displacement, is started for the first time (so-called cold start or key start).

A further case of application is coasting operation with switched-off internal combustion engine. In this case, electric consumers $R_1$ through $R_n$ are supplied, as explained, only by energy storage devices $B_1$ and $B_2$, because a generator G is not driven. In vehicles having high-power electric consumers $R_1$ through $R_n$, an excessive voltage drop can be prevented by connecting energy storage devices $B_1$ and $B_2$ in parallel.

A further case of application is recuperation at low generator rotational speeds $n<n_{12}$ (cf. FIG. 1). In this case, electric recuperation power can be stored in the two energy storage devices $B_1$ and $B_2$ even at low generator rotational speed. Through the connection in parallel of the two energy storage devices $B_1$ and $B_2$, the maximum possible charge power is doubled relative to only one energy storage device $B_1$ or $B_2$.

Figure 7:
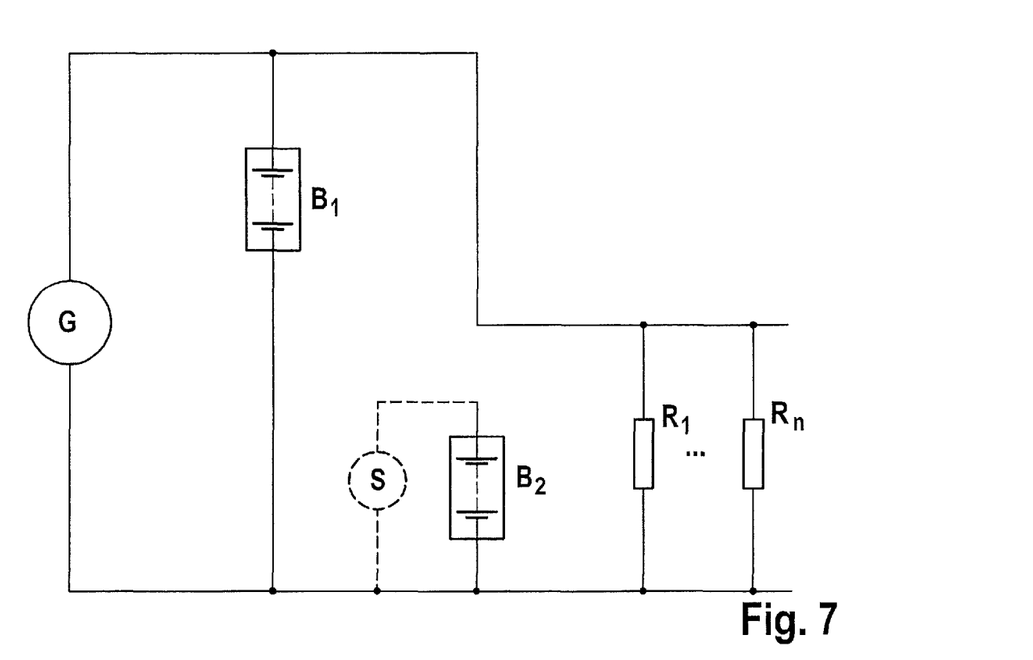
FIG. 7 shows the vehicle electrical network of FIG. 2 in a further switching state provided according to a specific embodiment of the present invention.

When $S_1=1$, $S_2=0$, $S_3=1$, and $S_4=0$, a switching state results as shown in FIG. 7.

According to FIG. 7, first energy storage device $B_1$ supplies electric consumers $R_1$ through $R_n$ during the starting of the internal combustion engine. Second energy storage device $B_2$ is decoupled and is used exclusively to supply starting device S. This switching state is advantageously used in start-stop systems during warm starting or during starting after a coasting phase of the vehicle. Through the decoupling of the starter battery (here second energy storage device $B_2$) and the supply battery (here first energy storage device $B_1$), during the starting process there occurs no drop in voltage at consumers $R_1$ through $R_n$. Optionally, starter device S can also be connected to first energy storage device B. In this case, switching element $S_3$ must be designed for the starter current.

Figure 8:
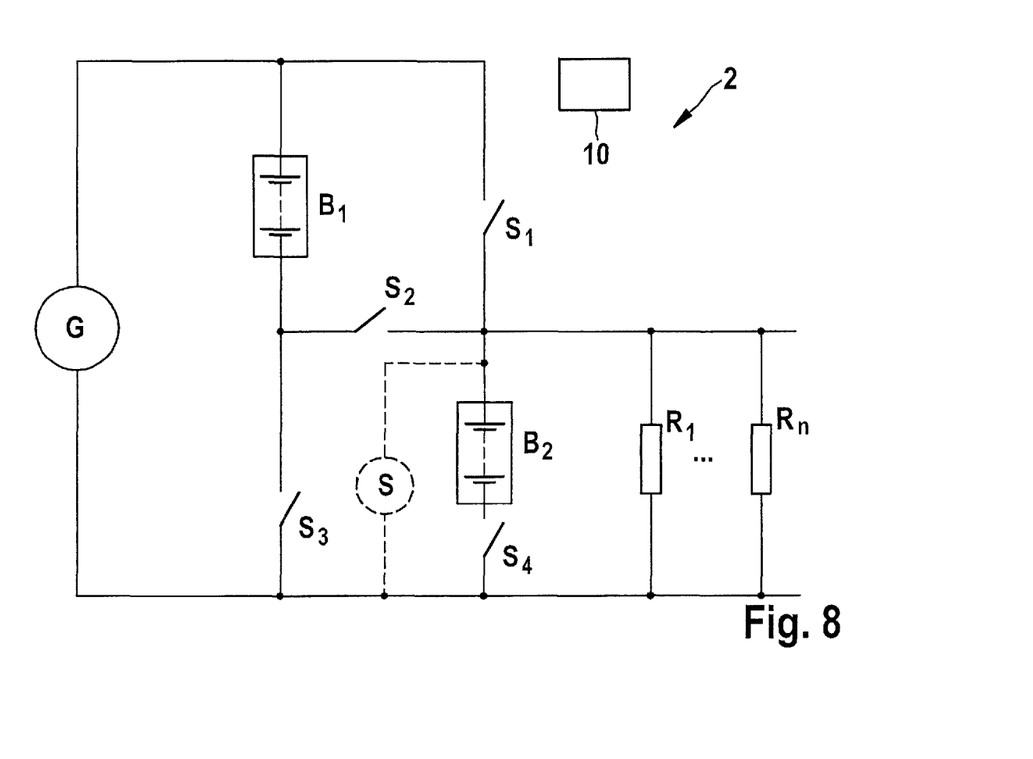
FIG. 8 shows a vehicle electrical network according to a further specific embodiment of the present invention, in a simplified schematic representation.

FIG. 8 shows a vehicle electrical network according to a further specific embodiment of the present invention, in the form of a circuit diagram, shown in simplified schematic form and designated 2 overall. Vehicle electrical network 2 differs from vehicle electrical network 1 of FIG. 2 in that switching element $S_4$ and second energy storage device $B_2$ have been exchanged. The above-explained advantages of the present invention can also be correspondingly realized in such a vehicle electrical network 2.

According to a specific embodiment of the present invention, a redundant supply of electricity during a coasting phase is enabled as follows:

If, during the coasting phase, the internal combustion engine is switched off and is decoupled from the rest of the drive train, generator G cannot supply any electrical energy. Electric consumers $R_1$ through $R_n$ are then supplied, given a conventional vehicle electrical network having only one energy storage device, only by this one energy storage device. If this storage device fails due to an error, all the electric consumers are then no longer supplied with power.

For this case of error, the system according to the present invention provides a redundant electrical supply during coasting phases. If during the coasting phase a switching state as shown in FIG. 4 is set and first energy storage device $B_1$ fails, a changeover takes place to the switching state shown in FIG. 5. In this state, second energy storage device $B_2$, as redundant energy source, supplies electric consumers $R_1$ through $R_n$.

If, in contrast, during the coasting phase a switching state is set as shown in FIG. 5 and second energy storage device $B_2$ fails, a changeover takes place to the switching state shown in FIG. 4. In this state, first energy storage device $B_1$ supplies electric consumers $R_1$ through $R_n$.

Therefore, the switching states shown in FIGS. 4 and 5, and energy storage devices $B_1$ and $B_2$, ensure a redundant electrical supply. The possibility of changeover between the switching states shown in FIGS. 4 and 5 can also be used to realize a redundant supply of power to safety-relevant consumers outside a coasting phase.

In the case of generator errors, for example a too-high output voltage, the electric supply of consumers $R_1$ through $R_n$ can be decoupled from generator G so that these consumers are not damaged.

When $S_1=0$, $S_2=0$, $S_3=1$, and $S_4=1$, or when $S_1=0$, $S_2=0$, $S_3=0$, and $S_4=1$, then in case of error in vehicle electrical networks 1 and 2 shown in FIGS. 2 and 8, generator G is decoupled from electrical consumers $R_1$ through $R_n$, and in this way the propagation of an error into the electrical supply network is prevented.

As a function of the respective operating point of generator G, for example the rotational speed and the output power, an improvement of the generator efficiency can be achieved by changing over to a different generator output voltage. If, in a particular working region, generator G has a higher efficiency at output voltage $U_1$, then the generator is operated in one of the switching states shown in FIG. 4, 5, or 6. If output voltage $U_2$ yields a higher efficiency, the switching state shown in FIG. 3 is set.

Figure 9:
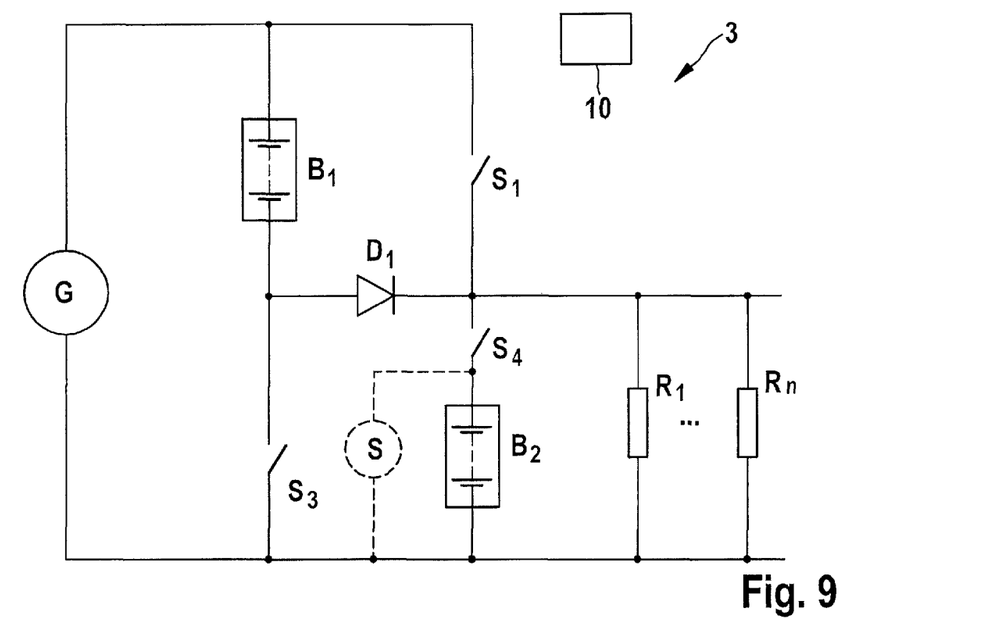
FIG. 9 shows a vehicle electrical network according to a further specific embodiment of the present invention, in a simplified schematic representation.

A further specific embodiment of the vehicle electrical network of the present invention results when, in the specific embodiment according to FIG. 2, second switching element $S_2$ is replaced by a diode $D_1$. This further specific embodiment is shown in FIG. 9. Here, the electrical network is designated 3 overall. In this specific embodiment, advantageously only the three switching elements $S_1$, $S_3$, and $S_4$ are still required. With the difference that switching element $S_2$ no longer has to be controlled, this specific embodiment corresponds analogously to the specific embodiment according to FIG. 2 (i.e. electrical network 1).

Figure 10:
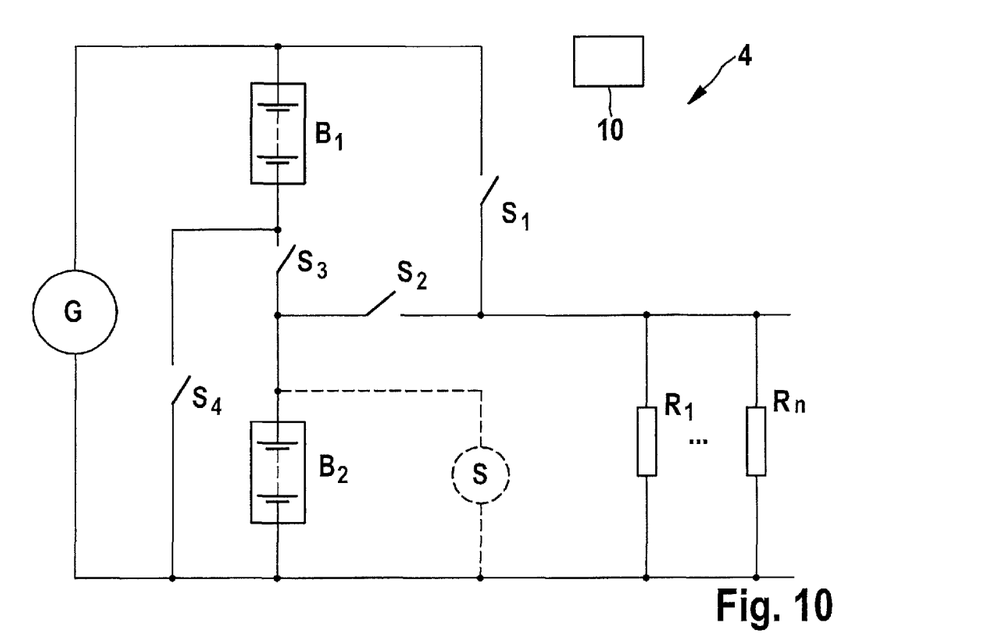
FIG. 10 shows a vehicle electrical network according to a further specific embodiment of the present invention, in a simplified schematic representation.

FIG. 10 shows a further specific embodiment of the vehicle electrical network of the present invention, designated 4 overall. The explanations and advantages according to the present invention of vehicle electrical network 1 of FIG. 2 hold analogously for the switching states of this specific embodiment:

$S_1=0$, $S_2=1$, $S_3=1$, and $S_4=0$ yields the switching state according to FIG. 3.

$S_1=1$, $S_2=0$, $S_3=0$, and $S_4=1$ yields the switching state according to FIG. 4.

$S_1=1$, $S_2=1$, $S_3=0$, and $S_4=0$ yields the switching state according to FIG. 5.

$S_1=1$, $S_2=1$, $S_3=0$, and $S_4=1$ yields the switching state according to FIG. 6.

$S_1=1$, $S_2=0$, $S_3=0$, and $S_4=1$ yields the switching state according to FIG. 7.

Figure 11:
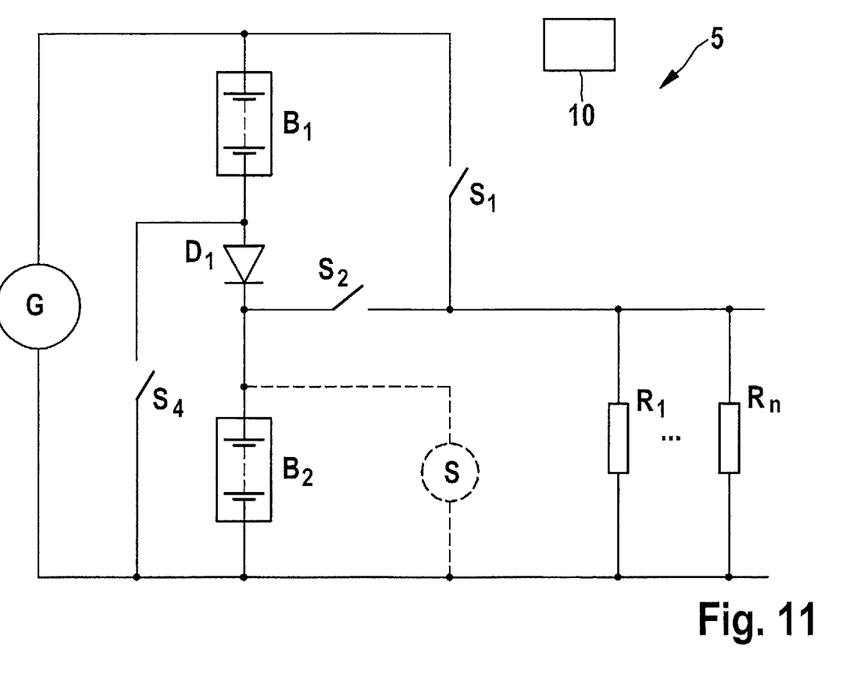
FIG. 11 shows a vehicle electrical network according to a further specific embodiment of the present invention, in a simplified schematic representation.

FIG. 11 shows a further specific embodiment of the vehicle electrical network of the present invention, designated 5 overall. This results when, in the specific embodiment according to FIG. 10, third switching element $S_3$ is replaced by a diode D. In this specific embodiment, only the three switching elements $S_1$, $S_2$, and $S_4$ are therefore advantageously required. With the difference that switching element $S_3$ no longer has to be controlled, this specific embodiment corresponds functionally to the specific embodiment according to FIG. 10 (i.e. vehicle electrical network 4).

The specific embodiments and switching states shown in FIGS. 2 through 11 are to be understood only as examples and are intended merely to illustrate the basic ideas of the present invention: using switching elements and, if warranted, additional diodes, the switching states shown in FIGS. 3 through 7 can be produced. Through these states, the advantages of the present invention can be achieved.

Alternatively, for all specific embodiments it is possible to use not only for example 12V lead batteries as energy storage devices $B_1$ or $B_2$, but also lithium-ion batteries or other electrical storage types.

Alternatively, for all specific embodiments it is possible to use not only 12V energy storage devices, but also energy storage devices having different voltages.

Alternatively, generator G can be replaced by an electric machine that can operate both as a motor and as a generator. In this case, the electric machine can optionally also be equipped with an additional power electronics system for controlling.

Optionally, the starting of the internal combustion engine can then take place with the aid of the electric machine. The electric machine can optionally also support the internal combustion engine during propulsion. If, for motoric operation of the electric machine, the switching state according to FIG. 3 is set, a higher voltage is then available for the motoric operation. This is advantageous in particular given higher demanded motoric outputs of the machine. In this case, however, vehicle electrical networks 3 (FIG. 9) and 5 (FIG. 11) cannot be used, because diode $D_1$ installed here prevents this.

The switching state according to FIG. 3 can also be used to supply an electric consumer with a higher voltage. This consumer is coupled to the outputs of generator G. When this consumer, for example an electric windshield heating unit, is activated, a changeover takes place to the switching state according to FIG. 3. The windshield heating unit is then supplied with a higher voltage. If these consumers are to be supplied even when the generator supplies no power, or insufficient power (e.g. when the internal combustion engine is switched off), then the supply has to take place from the batteries. In this case, however, vehicle electrical networks 3 (FIG. 9) and 5 (FIG. 11) cannot be used, because diode $D_1$ installed here prevents the supplying of these consumers.

Switching elements $S_1$ through $S_4$ can be realized for example by transistors or by other electronic components.

What is claimed is:

1. A vehicle electrical network, comprising:
   at least one electric machine configured to be operated at least as a generator;
   a first energy storage device;
   a second energy storage device; and
   a switching system configured to set the following switching states a) through c) alternatively to one another:
   a) one of (i) only the first energy storage device is connected to the electric machine or (ii) only the second energy storage device is connected to the electric machine;
   b) the first energy storage device and the second energy storage device are connected in parallel to the electric machine; and
   c) the first energy storage device and the second energy storage device are connected in series to the electric machine.

2. The vehicle electrical network as recited in claim 1, further comprising:
   at least one electric consumer configured to be selectively supplied with power by one of an output voltage of the first energy storage device or an output voltage of the second energy storage device.

3. The vehicle electrical network as recited in claim 1, further comprising:
   an electric high-load consumer configured to be supplied with power, in the switching state c), at least at times by an output voltage of the electric machine.

4. The vehicle electrical network as recited in claim 1, further comprising:
   a start device configured to be supplied with power by at least one of the first energy storage device and the second energy storage device.

5. The vehicle electrical network as recited in claim 1, wherein the electric machine is configured to be selectively operated in a generator mode and in a motor mode, the electric machine being supplied with power at least at times by the first energy storage device and by the second energy storage device for the motor mode operation.

6. The vehicle electrical network as recited in claim 1, wherein:
   the switching system includes: (i) a first switching element having first and second voltage terminals; (ii) one of a diode or a second switching element having first and second voltage terminals; (iii) a third switching element having first and second voltage terminals; (iv) a fourth switching element having first and second voltage terminals; and (v) a control device; and
   the diode permits a current flow in a first direction between the first and second voltage terminals of the diode, and blocks a current flow in a second direction opposite to the first direction.

7. The vehicle electrical network as recited in claim 6, wherein:
   the first voltage terminal of the electric machine, the first voltage terminal of the first energy storage device, and the first voltage terminal of the first switching element are connected in conductive fashion to one another;
   the second voltage terminal of the electric machine, the second voltage terminal of the second energy storage device, and the second voltage terminal of the third switching element are connected in conductive fashion to one another;
   the second voltage terminal of the first energy storage device, the first voltage terminal of the one of the second switching element or the diode, and the first voltage terminal of the third switching element are connected in conductive fashion to one another;
   the second voltage terminal of the first switching element, the second voltage terminal of the one of the second switching element or the diode, and the first voltage terminal of the fourth switching element are connected in conductive fashion to one another; and
   the second voltage terminal of the fourth switching element and the first voltage terminal of the second energy storage device are connected in conductive fashion to one another.

8. The vehicle electrical network as recited in claim 6, wherein:
   the first voltage terminal of the electric machine, the first voltage terminal of the first energy storage device, and the first voltage terminal of the first switching element are connected to one another in conductive fashion;
   the second voltage terminal of the electric machine, the second voltage terminal of the third switching element, and the second voltage terminal of the fourth switching element are connected to one another in conductive fashion;
   the second voltage terminal of the first energy storage device, the first voltage terminal of the one of the second switching element or the diode, and the first voltage terminal of the third switching element are connected to one another in conductive fashion;

the second voltage terminal of the first switching element, the second voltage terminal of the one of the second switching element or the diode, and the first voltage terminal of the second energy storage device are connected to one another in conductive fashion; and the first voltage terminal of the fourth switching element and the second voltage terminal of the second energy storage device are connected to one another in conductive fashion.

9. The vehicle electrical network as recited in claim 1, wherein:

the switching system includes: (i) a first switching element having first and second voltage terminals; (ii) a second switching element having first and second voltage terminals; (iii) one of a diode or a third switching element having first and second voltage terminals; (iv) a fourth switching element having first and second voltage terminals; and (v) a control device; and the diode permits a current flow in a first direction between the first and second voltage terminals of the diode, and blocks a current flow in a second direction opposite to the first direction.

10. The vehicle electrical network as recited in claim 9, wherein:

the first voltage terminal of the electric machine, the first voltage terminal of the first energy storage device, and the first voltage terminal of the first switching element are connected to one another in conductive fashion;

the second voltage terminal of the electric machine, the second voltage terminal of the second energy storage device, and the second voltage terminal of the fourth switching element are connected to one another in conductive fashion;

the second voltage terminal of the first energy storage device, the first voltage terminal of the one of the third switching element or the diode, and the first voltage terminal of the fourth switching element are connected to one another in conductive fashion;

the first voltage terminal of the second energy storage device, the second voltage terminal of the one of the third switching element or the diode, and the first voltage terminal of the second switching element are connected to one another in conductive fashion; and the second voltage terminal of the first switching element, and the second voltage terminal of the second switching element are connected to one another in conductive fashion.

11. The vehicle electrical network as recited in claim 6, wherein the control device controls the first through fourth switching elements in order to set the switching states a) through c).

12. A method for operating a vehicle electrical network having at least one electric machine configured to be operated at least as a generator, a first energy storage device, a second energy storage device, and a switching system, the method comprising:

setting, using the switching system, the following switching states a) through c) alternatively to one another:

a) one of (i) only the first energy storage device is connected to the electric machine or (ii) only the second energy storage device is connected to the electric machine;

b) the first energy storage device and the second energy storage device are connected in parallel to the electric machine; and c) the first energy storage device and the second energy storage device are connected in series to the electric machine.

13. The method as recited in claim 12, wherein the electric machine is operated in a generator mode, and the output voltage of the electric machine in the switching state c) is set higher than in at least one of the switching states a) and b).

14. A non-transitory computer-readable data storage medium storing a computer program having program codes which, when executed on a computer, performs a method for operating a vehicle electrical network having at least one electric machine configured to be operated at least as a generator, a first energy storage device, a second energy storage device, and a switching system, the method comprising:

setting, using the switching system, the following switching states a) through c) alternatively to one another:

a) one of (i) only the first energy storage device is connected to the electric machine or (ii) only the second energy storage device is connected to the electric machine;

b) the first energy storage device and the second energy storage device are connected in parallel to the electric machine; and c) the first energy storage device and the second energy storage device are connected in series to the electric machine.

* * * * *